US011096378B2

(12) United States Patent
Lagarde

(10) Patent No.: US 11,096,378 B2
(45) Date of Patent: Aug. 24, 2021

(54) SELF-STORABLE LIGHTWEIGHT ANIMAL LEASH

(71) Applicant: Colin Lagarde, New Orleans, LA (US)

(72) Inventor: Colin Lagarde, New Orleans, LA (US)

( * ) Notice: Subject to any disclaimer, the term of this patent is extended or adjusted under 35 U.S.C. 154(b) by 139 days.

(21) Appl. No.: 16/261,774

(22) Filed: Jan. 30, 2019

(65) Prior Publication Data

US 2020/0236908 A1 Jul. 30, 2020

(51) Int. Cl.
*A01K 27/00* (2006.01)
*B65H 75/00* (2006.01)

(52) U.S. Cl.
CPC .......... *A01K 27/003* (2013.01); *A01K 27/005* (2013.01); *B65H 75/00* (2013.01)

(58) Field of Classification Search
CPC .. A01K 27/003; A01K 27/005; A01K 27/004; A01K 27/008; B65H 75/00; B65H 75/36; B65H 75/366; Y10T 24/3924; Y10T 24/2708; Y10T 24/314; Y10T 24/316; Y10T 24/318
See application file for complete search history.

(56) References Cited

U.S. PATENT DOCUMENTS

| | | | | | |
|---|---|---|---|---|---|
| 5,233,942 | A | * | 8/1993 | Cooper | A01K 27/008 119/792 |
| 5,727,500 | A | * | 3/1998 | Conboy | A01K 23/005 119/174 |
| 6,000,591 | A | * | 12/1999 | Alexander | A45F 3/14 211/113 |
| 8,505,683 | B1 | * | 8/2013 | Dirrig | A63B 27/00 182/9 |
| 8,967,086 | B2 | | 3/2015 | Palladino | |
| 2008/0148533 | A1 | * | 6/2008 | Calkin | A61G 1/044 24/302 |
| 2010/0288207 | A1 | | 11/2010 | Hollenbeck et al. | |
| 2011/0011504 | A1 | * | 1/2011 | Steinbacher | A45C 15/00 150/106 |
| 2011/0214620 | A1 | * | 9/2011 | Johnson | A01K 27/00 119/792 |
| 2012/0160858 | A1 | * | 6/2012 | Vossman | A45C 11/22 220/694 |
| 2012/0167834 | A1 | | 7/2012 | Cummings et al. | |

(Continued)

OTHER PUBLICATIONS

Leashboss. <https://www.leashboss.com/products/leashboss-long-trainer-30-foot-1-inch-nylon-long-dog-training-leash-with-hook-and-loop-coiling-system>.

*Primary Examiner* — Christopher D Hutchens
*Assistant Examiner* — Arfan Y. Sinaki
(74) *Attorney, Agent, or Firm* — Williams Intellectual Property; Timothy Snyder

(57) ABSTRACT

A self-storable lightweight animal leash is described herein. The animal leash includes a distal region, an opposing proximal region, and a medial region therebetween. The distal region may include a receptacle and a self-containable bundling member. The bundling member includes a secured portion fixed inside the receptacle and a bundling portion deployable from the receptacle. The bundling portion is deployable such that when the leash is coiled together, the bundling portion can wrap around the coils to store the leash in a bundled and compact form. The animal leash is particularly useful for backpackers, hikers, campers, and user who frequently travel with their animal.

16 Claims, 6 Drawing Sheets

(56) References Cited

U.S. PATENT DOCUMENTS

2013/0167782 A1* 7/2013 Poch .................... A01K 27/003
                                                          119/795
2017/0094945 A1   4/2017 Sullivan
2017/0112103 A1   4/2017 Iles et al.
2019/0200576 A1* 7/2019 Moore ................. A01K 27/003

* cited by examiner

SELF-STORABLE LIGHTWEIGHT ANIMAL LEASH

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of animal leashes are known in the prior art. For example, a simple animal leash may consist of a single strap attachable to an animal's collar, while more complex designs may include a retracting mechanism that automatically adjusts the length of the leash. However, what is lacking in the art is an animal leash that is self-storable, lightweight, and transportable, especially for traveling situations where storage space is limited, or where the weight of the leash needs to be minimized. For instance, backpackers, campers, and hikers are constantly in search of lighter equipment that can shed just a couple ounces off their packs or overall equipment. This applies to the overall size of the equipment as well. For these situations, the last thing a user wants to worry about is traveling with a bulky or heavy leash for their animal, especially considering that said leash will only be needed to tether the animal in rare or intermittent situations, and the leash will spend the majority of the trip packed away and being carried in full by the animal owner.

The same applies for an animal that constantly travels with or accompanies their human companion. During a particular trip or adventure, an animal leash may be used temporarily or intermittently, where the leash is regularly attached then detached from the animal. In such a scenario, a user should be able to quickly deploy the leash when needed and easily store and transport the leash when not in use tethering the animal.

Thus, there exists a need in the art for an animal leash that is self-storable, lightweight, and easily transportable while still retaining the full functionality of a traditional leash, including without limitation, appropriately sized hardware, and the length and width of a leash.

FIELD OF THE INVENTION

The present invention relates to animal leashes, and more particularly, to an animal leash having a bundling mechanism to self-store the leash in a bundled and compact form for easy storage and transportation.

SUMMARY OF THE INVENTION

The general purpose of the self-storable lightweight animal leash, described subsequently in greater detail, is to provide an animal leash which has many novel features that result in an animal leash which is not anticipated, rendered obvious, suggested, or even implied by prior art, either alone or in combination thereof.

A self-storable lightweight animal leash is provided herein. The leash includes a distal region, an opposing proximal region, and an elongated medial region therebetween. The leash further includes a bundling member having a secured portion and a bundling portion. The secured portion is fixed to the leash at either the distal region or the proximal region. The bundling portion extends from the secured portion such that when the leash is coiled together, the bundling portion can wrap around the coils to self-store the leash in a bundled and compact form. An attachment member is positioned at the distal region to attach to an animal or animal garment.

The distal region may further include a receptacle where the bundling member is self-containable therein. The secured portion is fixed inside the receptacle and the bundling portion is deployable to wrap around the coils and self-store the leash.

A self-storable lightweight leash may also include a bundling member positioned at the proximal region. The proximal region of the leash may be a looped handle composed of a loop and a loop junction. The secured portion of the bundling member may be fixed at the loop junction with the bundling portion extending from the secured portion. The bundling portion may extend into the loop of the looped handle to be self-contained therein while the leash is in use.

A self-storable lightweight leash may also include a receptacle at the distal region, where the receptacle has a transverse through-hole formed between two stacked layers of leash. The bundling member likewise has a secured portion and a bundling portion. The secured portion is fixed to an interior surface of the receptacle and self-contained therein. The bundling portion loops arounds an exterior surface of the receptacle from one end of the through-hole to the other such that the bundling portion can be stretched around the coils to self-store the leash.

Thus has been broadly outlined the more important features of the present animal leash so that the detailed description thereof that follows may be better understood and in order that the present contribution to the art may be better appreciated.

Objects of the present animal leash, along with various novel features that characterize the invention are particularly pointed out in the claims forming a part of this disclosure. For better understanding of the self-storable lightwewight animal leash, its operating advantages and specific objects attained by its uses, refer to the accompanying drawings and description.

BRIEF DESCRIPTION OF THE DRAWINGS

In the figures, identical structures, element or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

FIGURES

Figure 1:
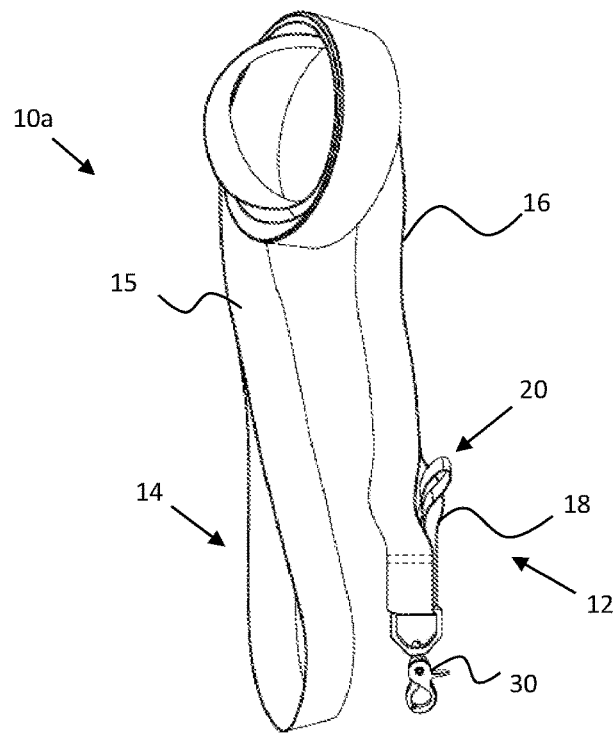

FIG. 1 is a perspective view of a self-storable animal leash in accordance with embodiments of the invention.

Figure 2:
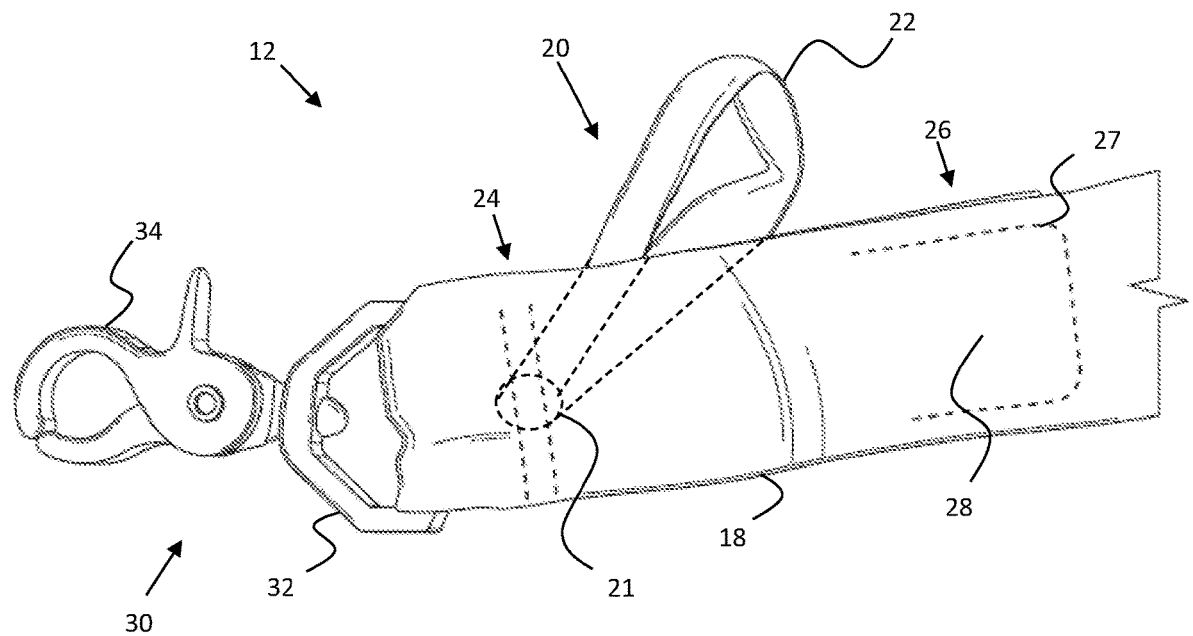

FIG. 2 is a detailed view of a distal region of the animal leash in accordance with embodiments of the invention.

Figure 3:
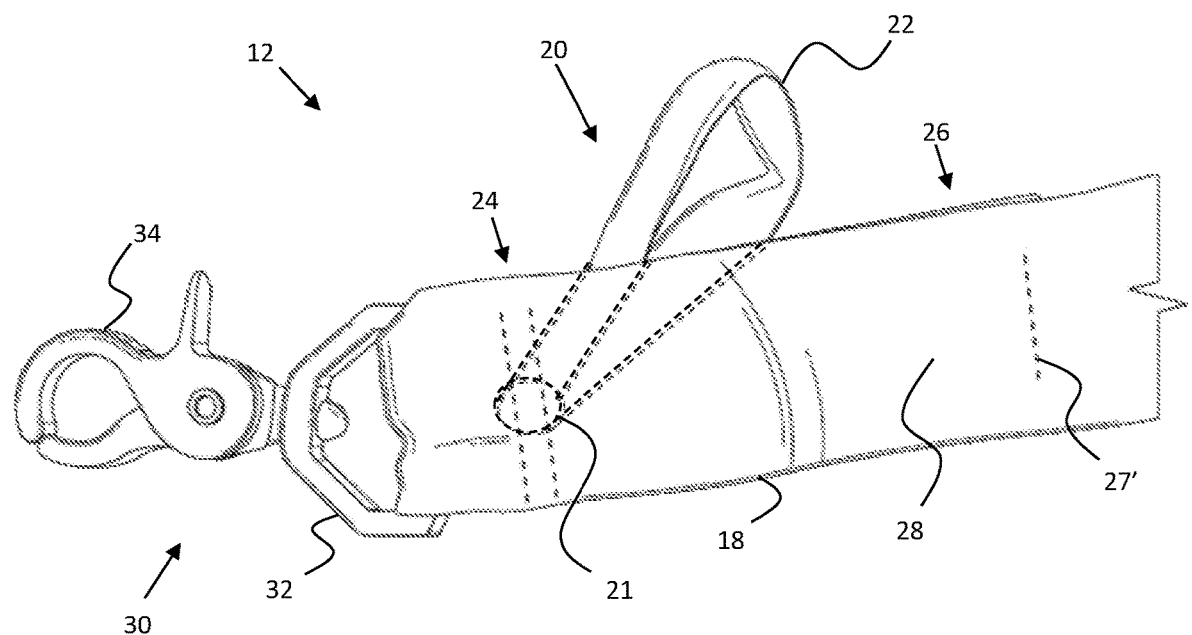

FIG. 3 depicts the animal leash having a pocket formed by a straight stitch at a proximal section of a receptacle in accordance with embodiments of the invention.

Figure 4:
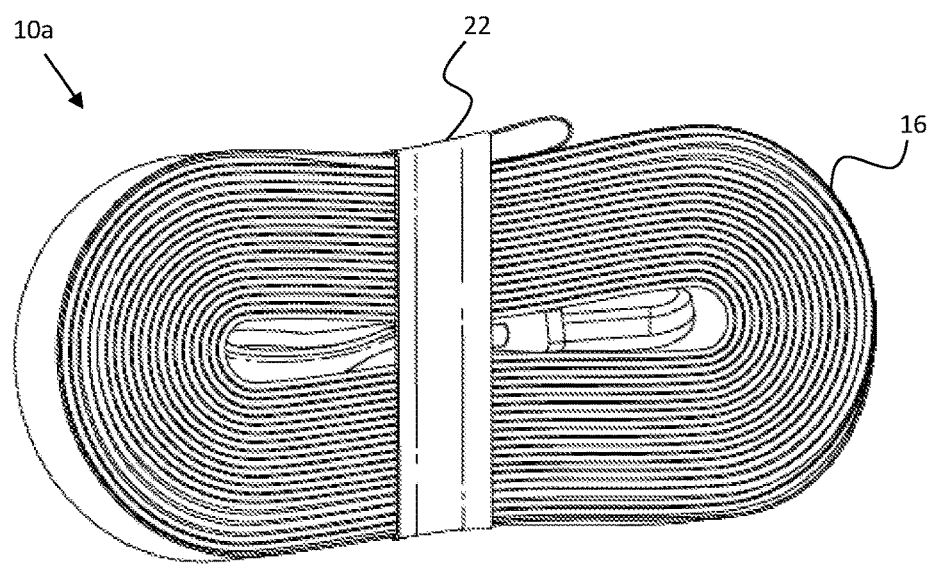

FIG. 4 depicts the animal leash self-stored in a bundled and compact form in accordance with embodiments of the invention.

Figure 5:
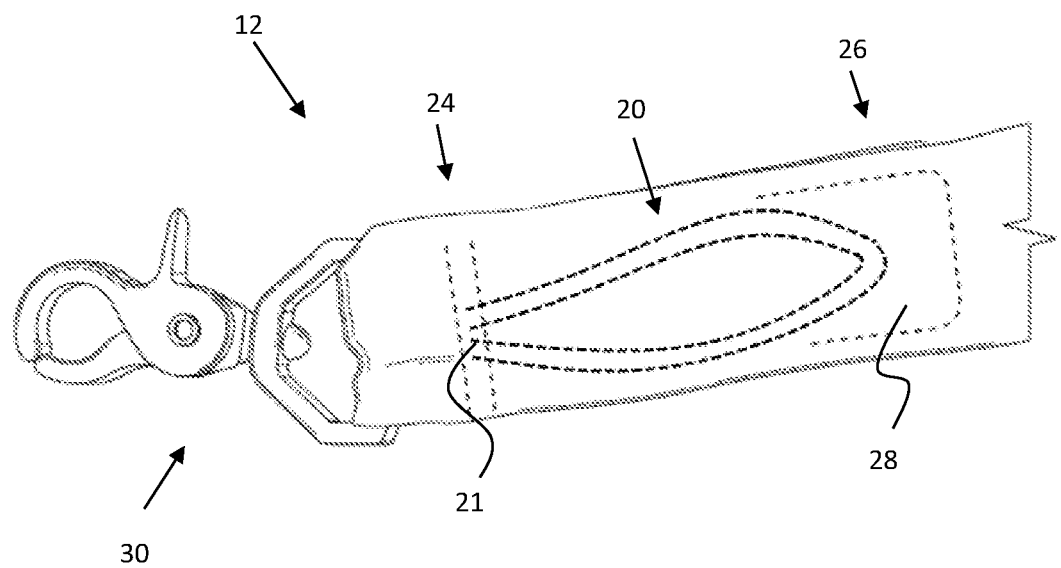

FIG. 5 depicts the animal leash with a bundling member self-contained inside a receptacle of the leash in accordance with embodiments of the invention.

Figure 6:
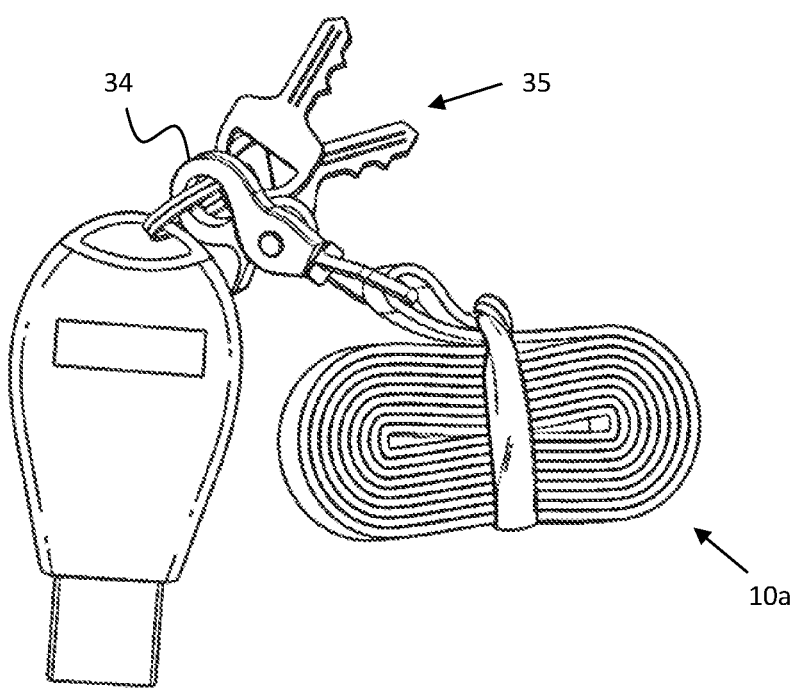

FIG. 6 depicts the leash in a bundled form and secured to a set of keys for easy transportation in accordance with embodiments of the invention.

Figure 7:
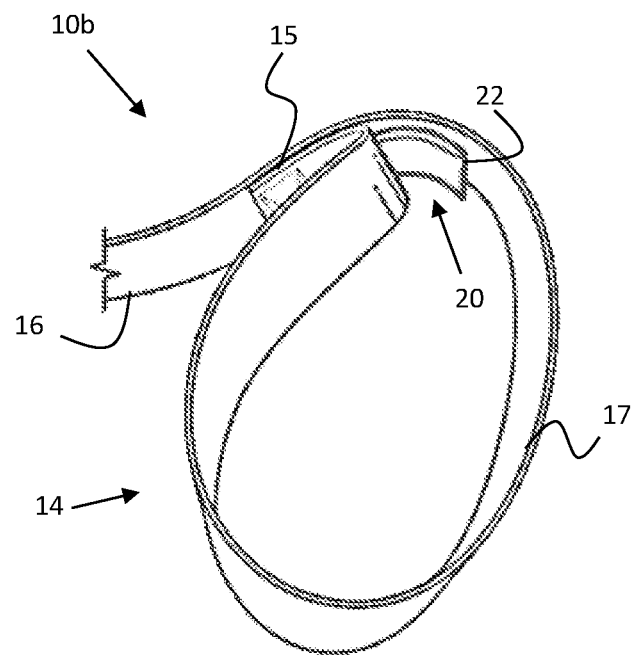

FIG. 7 depicts a proximal region of a leash in the form of a looped handle with a bundling member self-contained in the loop in accordance with embodiments of the invention.

Figure 8:
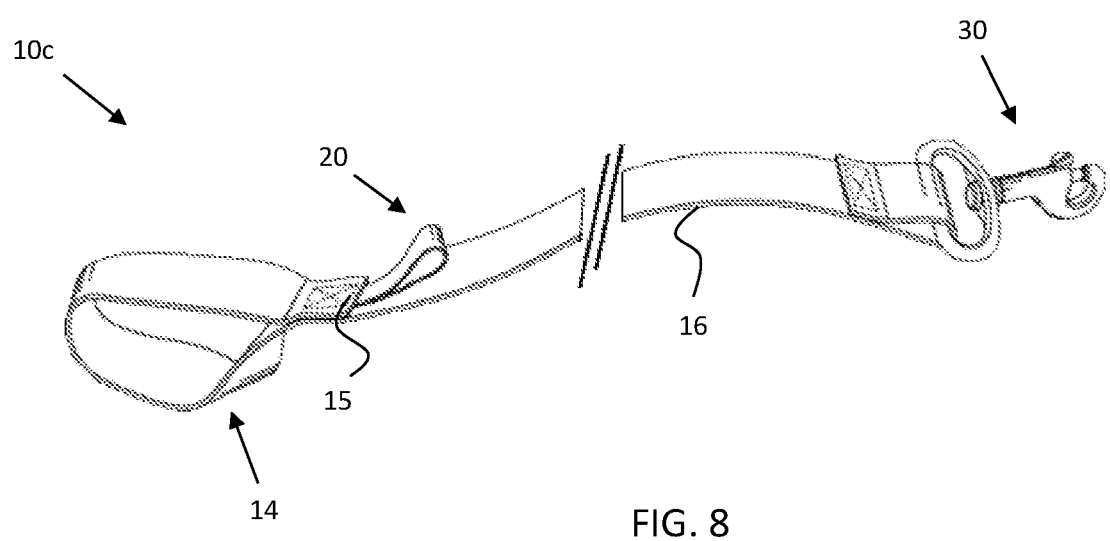

FIG. 8 depicts an animal leash having a looped handle with a bundling member aligned with the longitudinal axis of the leash in accordance with embodiments of the invention.

Figure 9:
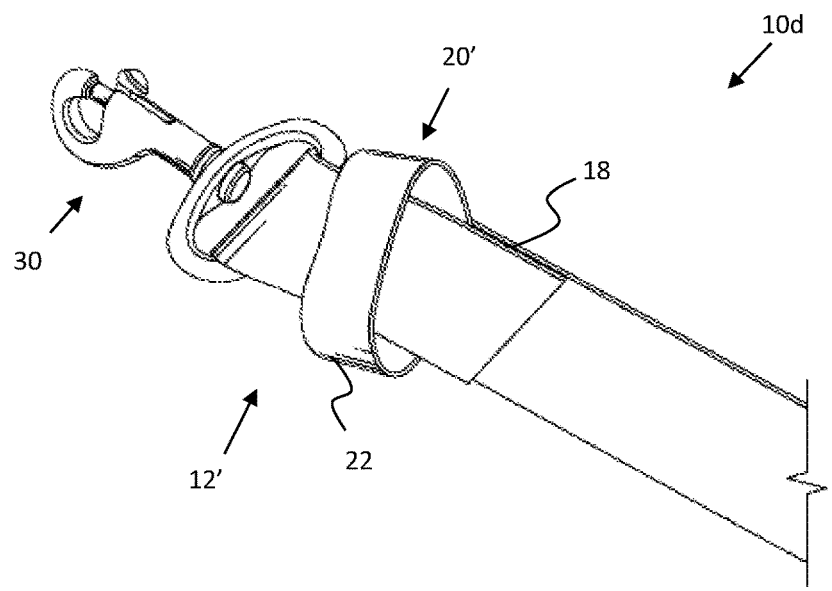

FIG. 9 depicts an animal leash with a bundling member looped around an exterior surface of a receptacle of the leash in accordance with embodiments of the invention.

Figure 10:
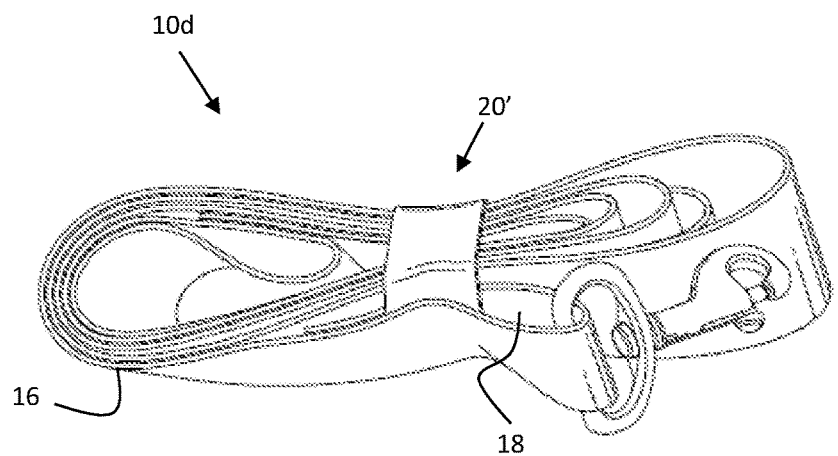

FIG. 10 depicts the animal leash of FIG. 8 self-stored in a bundled and compact form.

Figure 11:
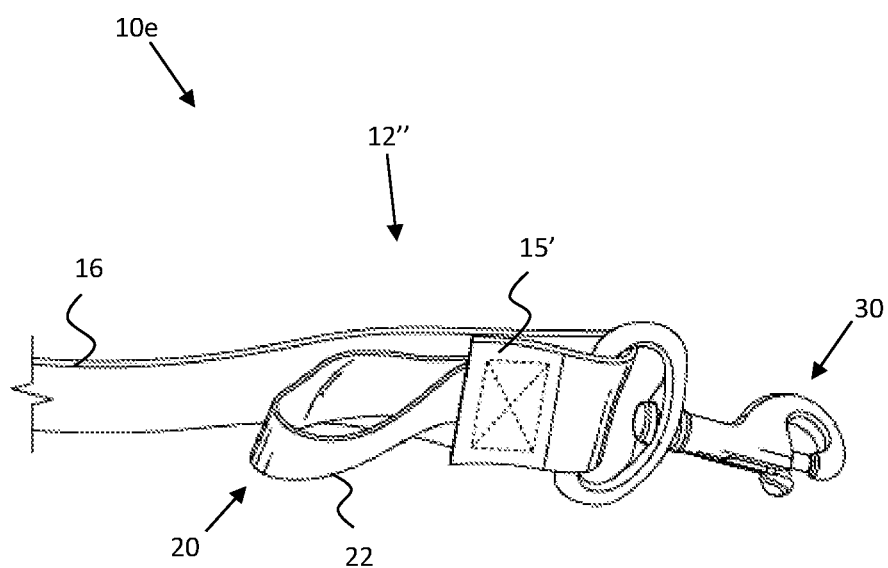

FIG. 11 depicts an animal leash with a bundling member at a distal region of the leash in accordance with embodiments of the invention.

DETAILED DESCRIPTION OF THE DRAWINGS

The present invention has utility as a self-storable and lightweight animal leash. The animal leash is particularly useful for backpackers, hikers, campers, and other users who frequently travel with their animals. Further, it will be appreciated that the animal leash described herein maintains a length that is user-friendly for walking their animal. This overcomes several problems associated with "emergency" leashes which sacrifice their length for easy transportation. In addition, the materials and construction of the present animal leash are particularly cost-effective on the scale of a comparable leash found at a local pet store, thereby making the leash particularly attractive for the everyday user, and more specifically for the specific users described above. The following description of various embodiments of the invention is not intended to limit the invention to those specific embodiments, but rather to enable any person skilled in the art to make and use this invention through exemplary aspects thereof.

It is to be understood that in instances where a range of values are provided, that the range is intended to encompass not only the end point values of the range but also intermediate values of the range as explicitly being included within the range and varying by the last significant figure of that range. By way of example, a recited range of 1 to 4 is intended to include 1-2, 1-3, 2-4, 3-4, and 1-4.

With reference now to the drawings, and in particular FIGS. 1 through 10 thereof, examples of the instant self-storable lightwewight animal leash employing the principles and concepts of the present self-storable lightwewight animal leash and generally designated by the reference number 10 will be described.

Referring to FIGS. 1 through 6, a preferred embodiment of a self-storable lightwewight animal leash 10a is illustrated. The animal leash 10a generally includes a distal region 12, an opposing proximal region 14, and an elongated medial region therebetween 16. The distal region 12 is generally configured to secure the leash to an animal or animal garment, and may further include components to self-store the leash 10a as further described below. The opposing proximal region 14 generally acts as a handle or other holding mechanism for a user to grasp the leash 10a. The handle may be formed as a loop by looping a proximal end of the leash onto a more distal portion of the leash 10a and securing the proximal end thereto. The location where the proximal end and the more distal portion assemble may be referred to herein as a loop junction 15. The elongated medial region 16 contributes to the overall length of the leash 10a and allows a user to comfortably walk, corral, or otherwise hold their animal at a suitable distance from their person. The elongated medial region 16 may be a non-rigid elongated strap, cord, or other non-rigid elongated segment disposed between the distal region 12 and proximal region 14. The elongated medial region 16 may further be elastic. In a specific embodiment, the elongated medial region 16 is made of a thin, yet strong, military grade nylon flat webbing having a thinness of 0.95 to 1.02 millimeters (mm), and a tensile strength of equal to or greater than 500 pounds. The thinness and properties of this particular material permit the leash 10a to be exceptionally light, strong, easy to coil into a compact state, and long enough to provide a user-friendly experience while using the leash 10a. Overall dimensions and weights of the leash 10a with this particular material is further provided below. However, it should be appreciated that the dimensions and weights of the leash 10a may vary substantially while still maintaining the intended utility of the leash 10a.

The animal leashes described herein further include a bundling member 20. The bundling member 20 includes a secured portion 21 and a bundling portion 22. The secured portion 21 is fixed to at least one of the distal region or the proximal region of a leash, where the bundling portion 22 extends from the secured portion 21 such that when the leash is coiled together, the bundling portion 22 can wrap around the coils to self-store the leash in a bundled and compact form as best seen in FIG. 3.

In specific inventive embodiments, the animal leash 10a includes a receptacle 18 formed as part of the distal region 12. The receptacle 18 permits the bundling member 20 to be self-contained therein when the bundling portion 22 is not deployed to coil and self-store the leash 10a. The secured portion 21 of the bundling member 20 is fixed inside the receptacle 18, and the bundling portion 22 extends from the secured portion 21 to be deployed from the receptacle 18. FIG. 2 depicts the bundling portion 22 deployed from the receptacle 18 and FIG. 4 depicts the bundling portion 22 wrapped around the coils of the leash 10a. Then, when the leash 10a is in use, the bundling member 20 can be tucked away inside the receptacle 18 as shown in FIG. 5. This is particularly advantageous. For one, the self-containable bundling member 20 provides the self-storable attributes of the leash 10a. A user can quickly coil, store, and transport the leash 10a when not needed without the need for a separate strap or storing mechanism. Then, when the leash is in use, the bundling member 20 can be tucked inside the receptacle 18 to ensure the bundling member 20 does not get snagged on any objects or interfere with the animal or user. Thus, there are no straps dangling from the leash 10a while in use, which may otherwise by cumbersome to handle and/or pose a risk to the animal. In addition, when the bundling member 20 is tucked away, the leash 10a is indistinguishable from a traditional leash, making the leash aesthetically appealing.

The receptacle 18 may be formed as part of the distal region 12 as follows. A distal end of the leash 10a may be double backed onto itself to form two layers of leash, one on top of the other. The two layers of leash are then secured together at two different sections (a distal section 24 and a proximal section 26) along the longitudinal axis of the leash. The two layers of leash may be secured together by at least one of an adhesive, stitching, or fastening element (e.g., a snap, a button, a staple, a rivet, a screw mechanism). In specific embodiments, the two layers of leash at the distal section 24 and proximal section 26 are sewn together, while in other embodiments a snap, button, or other temporary securable fixation device is used. The securing of the two layers of leash at the distal section 24 and proximal section 26 gives form to the receptacle 18, where the receptacle 18 comprises the space between: a) the two layers of leash; b) the distal section 24; and c) the proximal section 26. The receptacle 18 therefore has a transverse through-hole between the two layers of leash such that a user can deploy the bundling portion 22 of the bundling member 20 from either side of the receptacle 18. This provides another advantage as the bundling member 20 is accessible no matter how the user coils or bundles the leash 10a.

The bundling member 20 may come in a variety of forms. The bundling member 20 may be an elastic band or loop, an elastic cord, or a strap having a hook region and loop region (e.g., Velcro®). Preferably, the bundling member 20 is an elastic band or loop as shown in the figures, which is advantageous from a self-storage and deployment perspective due to the bands elasticity (i.e., the band is smaller to store inside the receptacle 18, and stretchable to wrap around the coils). To secure the secured portion 21 of the bundling member 20 inside the receptacle 18, the secured portion 21 may be sewn between the two layers of the leash in the distal section 24. In other embodiments, the secured portion 21 is sewn between the two layers of the leash in the proximal section 26. Other mechanisms to fix the secured portion 21 in the receptacle 18 include adhesives and fastening elements. Inventive embodiments of the specific dimensions of the elastic band and receptacle are further described below.

The animal leash 10a may further include a pocket 28 having an opening that is open to the receptacle 18 to receive at least a part of the bundling portion 22 of the bundling member 20 therein. The pocket 28 may be formed between the two layers of the leash in the proximal section 26. In particular embodiments, the pocket 28 is formed by a semi-circular, U-shaped, or semi-elliptical stitching pattern 27 at the proximal section 26 wherein the open-end of the stitching pattern faces the receptacle 18. In a specific embodiment, with reference to FIG. 3 the pocket is formed by a straight stitch 27' at the proximal section 26. A straight stitch 27' may be a more economical way to mass-produce the leash 10a and also makes it easier for older users or users with arthritis to deploy and tuck the bundling portion 22 inside the pocket 28. Overall, the pocket 28 is particularly advantageous as a user can further tuck at least a part of the bundling portion 22 inside the pocket 28 to further ensure the bundling member 20 does not fall out of the leash 10a while the leash 10a is attached to an animal.

In particular inventive embodiments, the bundling member 20 and the receptacle 18 are optimally dimensioned to permit the bundling member 20 to bundle the entire leash 10a when coiled, while at the same time allowing the bundling member 20 to tuck inside the receptacle 18 and/or pocket 28 when the leash 10a is in use. The overall dimensions of the leash 10a are likewise optimized for this purpose. The ratios of these dimensions are particularly important for the overall functionality of the leash 10a described herein. In a specific embodiment, the bundling member 20 is an elastic band having an approximate length of 3.5-5.0 centimeters (cm) measured from the secured portion 21 to the end of the bundling portion 22 while in a non-stretched state. The elastic band may have a width of approximately 0.3 cm to 1.0 cm. The elastic band may be made of a braided elastic polymeric material such as a rubber and polyester mix. The elastic band may stretch approximately twice its resting length. The cumulative length of the receptacle 18 and the pocket 28, or the receptacle 18 alone (if a pocket 28 is not present) may range from 5.0-6.5 cm with an approximate width of 2.0-3.0 cm. The overall length of the leash (tip to tip) may range from 120-200 cm for a leash made of the military grade nylon as described above. It should be appreciated that a leash having a length of 120-200 cm is commonly available on the market and regularly used by animal owners. Therefore, a desired ratio of the length of the elastic band to the length of the receptacle ranges from 0.54-1.0, and more preferably, 0.6-0.8. The desired ratio of the length of the elastic band to the overall length of the leash ranges from 0.025-0.042, and more preferably, 0.029-0.036. For these particular materials (thinness, material, elasticity, and dimensions), these ratios have been optimized to capitalize on the advantages of the animal leash 10a described herein.

Embodiments of the animal leash 10a may further include an animal attachment member 30 disposed as part of the distal region 12. The attachment member 30 is configured to attach to an animal or an animal garment (e.g., collar, harness, and clothing). The attachment member 30 may be disposed distal to the receptacle 18 and assembled in the fold formed between the two layers of the leash. More specifically, the attachment member 30 includes an eyelet 32 connected with a securing mechanism 34, wherein the distal end of the leash is threaded through the eyelet 32 to loop the eyelet 32 between the two layers of the leash. The securing mechanism 34 includes at least one of a spring hook, a non-swivel hook, a swivel hook, a bolt snap, a trigger snap, a marine hook, or a lobster claw. The securing mechanism 34 is preferably made of a rigid, and strong, material such as brass, steel, or titanium. In particular embodiments, the securing mechanism is made of brass for its material properties and cost effectiveness.

Overall, the weight of the leash 10a in its entirety is approximately 1.0-3.0 ounces (oz.), and more specifically, 1.4-1.7 oz. In addition, with reference to FIG. 6, the leash 10a may be coiled or bundled to expose the securing mechanism 34 to connect with various secondary structures 35 such as a set of keys, belt loop, carabiner, etc. The bundling member 20 securely holds the leash 10a in a bundled state while the user can simply attach the leash to the secondary structure for easy transportation.

In a specific embodiment, with reference to FIG. 7, a self-storable lightweight animal leash 10b may include a bundling member 20 positioned at the proximal region 14 of the leash 10b. The proximal region 14 of the leash may be a looped handle composed of a loop 17 and a loop junction 15. The looped handle may be formed as described above by looping the proximal end of the leash onto a more distal portion therefrom and securing the proximal end thereto to form the loop 17 and loop junction 15. The secured portion 21 of the bundling member 20 is fixed at the loop junction 15. The secured portion 21 may be fixed between the two layers of leash that make up the loop junction 15 by way of stitches, adhesives, or a fastening element. The bundling portion 22 of the bundling member 20 extends from the secured portion to wrap around the coils of the leash 10b. In a particular inventive embodiment, the bundling portion 22 extends into the loop 17 to be self-contained therein when the leash 10b is in use. This imparts the same advantages as described above with respect to the receptacle 18 where the bundling member can be quickly deployed to self-store the leash and then self-contained when not in use. In this regard, the bundling member 20 is preferably an elastic band that can stretch around the coils and self-store the leash 10b.

In another embodiment, with reference to FIG. 8, a self-storable leash 10c may also include the bundling member 20 at the proximal region 14 like the leash 10b of FIG. 6. However, here, the bundling portion 22 of the bundling member 20 may extend away from the loop 17. The bundling member 20 of the leash 10c is preferably an elastic band having a longitudinal axis aligned with the longitudinal axis of the leash 10c. While not self-containable in this configuration, the size and position of the bundling member 20 on the leash 10c greatly reduces the chance of the bundling portion 22 snagging on other objects or interfering with the user or animal while the leash 10c is in use.

In a specific embodiment, with reference to FIG. 9, a self-storable leash 10d may also include a receptacle 18 at a distal region 12' of the leash 10d with a differently configured bundling member 20'. The receptacle 18 may be formed as described above by looping the distal end of the leash back onto itself to create two layers of leash that are then secured at a distal section 24 and a proximal section 26. The receptacle 18 therefore has a transverse through-hole formed between the two stacked layers of leash. The bundling member 20' is in the form of a bundling loop. The secured portion 21 is fixed to an interior surface of the receptacle 18' and self-contained therein. The bundling portion 22 loops arounds an exterior surface of the receptacle 18' from one end of the through-hole to the other to form a bundling loop around the receptacle 18'. The bundling portion 22 can therefore be stretched around the coils to self-store the leash as best seen in FIG. 10. Again, although the bundling portion 22 is not self-containable inside the receptacle 18, the dimensions and position of the bundling member 20' ensures limited interference with a user or animal while in use, and easily accessible to quickly self-store the leash 10d. In addition, the bundling member 20' is preferably an elastic band for the advantages as described above.

With reference to FIG. 11, another embodiment of a self-storable leash 10e is shown. The self-storable leash 10e includes a bundling member 20 positioned at a distal region 12" of the leash 10e where the distal region 12" does not include a receptacle. Rather, the secured portion 21 of the bundling member 20 is fixed to the leash 10e just proximal to an attachment member 30. The secured portion 21 may be fixed by means known in the art. In an embodiment, a distal end of the leash 10e is looped back onto itself and secured to form a loop junction 15' composed of two stacked layers of leash. The secured portion 21 may then be fixed in the loop junction between the two layers of leash by way of stitching, an adhesive, or a fastening element. The bundling portion 22 extends from the secured portion 21 to wrap around the coils and self-store the leash 10e. In particular, the bundling member 20 is an elastic band having a longitudinal axis aligned with the longitudinal axis of the leash 10e. The bundling portion 22 may extend away from the attachment member 30 along this axis. In this configuration, the alignment, dimensions, and position of the bundling member 20 ensures limited interference with a user or animal while in use, and quickly accessible to quickly self-store the leash 10d, even though the bundling member 20 is not self-containable.

In particular inventive embodiments, any of the leashes 10 described herein may further include a secondary handle positioned near or at the distal region 12 of the leash 10. The secondary handle is dimensioned to permit a user's hand to fit therethrough to have a closer hold of the animal, commonly referred to as a "city lead". In one embodiment, the secondary handle is the receptacle 18, where the receptacle 18 is large enough to receive the user's hand therethrough. In other embodiments, the secondary handle is separate from the receptacle 18, where the secondary handle is positioned either distally or proximally from the receptacle 18. It will be appreciated that the secondary handle may be particularly advantageous for longer leash lengths, such as a 6 foot leash.

Finally, it should be appreciated that the ratios, dimensions, materials, and components of the leash 10a as described with reference to FIGS. 1 to 5, may be equally applied to the other leashes (10b, 10c, 10d, and 10e). For example, the attachment member 30 may be used with any of the self-storable leashes described herein. Similarly, the size of the bundling member 20 relative to the length of the leash 10a of FIG. 1 may be the same for the leash 10b as shown in FIG. 7.

OTHER EMBODIMENTS

While at least one exemplary embodiment has been presented in the foregoing detail description, it should be appreciated that a vast number of variations exist. It should also be appreciated that the exemplary embodiment or exemplary embodiments are only examples, and are not intended to limit the scope, applicability, or configuration of the described embodiments in any way. It should be understood that various changes may be made in the function and arrangement of elements without departing from the scope as set forth in the appended claims and the legal equivalents thereof.

What is claimed is:

1. A self-storable lightwewight animal leash comprising:
   a distal region, an opposing proximal region, and an elongated medial region therebetween, wherein the distal region comprises two layers of leash formed by folding a distal end of the leash back onto itself and securing a distal section of the two layers together and a proximal section of the two layers together;
   a receptacle formed by the space between a) the two layers of leash; b) the distal section, and c) the proximal section thereby creating two opposing side openings that are freely open to the surroundings;
   an elastic band having a secured portion and a bundling portion extending from the secured portion, wherein the secured portion is fixed inside the receptacle at either the distal section or the proximal section and the bundling portion is storable inside the receptacle and extendable therefrom from either of the two opposing side openings such that when the leash is coiled together, the bundling portion can wrap around the coiled leash to self-store the leash in a bundled and compact form; and
   an attachment member positioned at the distal region to attach to an animal or animal garment.

2. The animal leash of claim 1 further comprising a pocket situated between the two layers of leash and having an opening to the receptacle, wherein said pocket receives at least a part of the bundling portion of the elastic band therein.

3. The animal leash of claim 2 wherein the two layers of leash at the distal section and the proximal section are secured by at least one of an adhesive, stitching, or fastening element.

4. The animal leash of claim 3 wherein the pocket is formed between the two layers of the leash in the proximal section, and wherein the pocket is formed by a straight, semi-circular, U-shaped, or semi-elliptical stitching pattern at the proximal section.

5. The animal leash of claim 4 wherein the secured portion of the bundling member is sewn between the two layers in the distal section to fix the bundling member therein.

6. The animal leash of claim 5 wherein a ratio of the length of the elastic band to the length of the receptacle ranges from 0.54 to 1.0, wherein the ratio provides an optimal fit of the band inside the receptacle while also permitting the band enough length to wraparound the coils of the leash for storage in a compact form.

7. The animal leash of claim 6 wherein the ratio of the length of the elastic band to the overall length of the leash ranges from 0.025 to 0.042 to provide the leash a sufficient length for walking an animal and maintaining a total weight of 1.0 to 2.0 ounces.

8. The animal leash of claim 7 wherein the attachment member has an eyelet connected with a securing mechanism, wherein the distal end of the leash is threaded through the eye to loop the eye between the two layers of leash, and wherein the securing mechanism comprises at least one of a spring hook, a non-swivel hook, a swivel hook, a bolt snap, a trigger snap, a marine hook, or a lobster claw to assemble to an animal or animal garment.

9. The animal leash of claim 8 wherein the proximal region comprises a handle, said handle formed as a loop by looping a proximal end of the leash onto a more distal portion therefrom and securing the proximal end thereto.

10. The animal leash of claim 9 further comprising a secondary handle at or near the distal region, wherein the secondary handle is dimensioned to permit a user's hand to fit therethrough to have a closer hold of the animal.

11. The animal leash of claim 1 wherein the proximal region of the leash is a looped handle comprising a loop with a loop junction.

12. The animal leash of claim 11 wherein the loop junction comprises two layers of leash secured to one another, and wherein the secured portion is fixed between the two layers of the leash at the distal section by at least one of a stitch, adhesive, or fastening element.

13. The animal leash of claim 12 wherein the attachment member has an eyelet connected with a securing mechanism, wherein the distal end of the leash is threaded through the eye to loop the eye between two layers of leash, and wherein the securing mechanism comprises at least one of a spring hook, a non-swivel hook, a swivel hook, a bolt snap, a trigger snap, a marine hook, or a lobster claw to assemble to an animal or animal garment.

14. A self-storable lightweight animal leash comprising:
a distal region, an opposing proximal region, and an elongated medial region therebetween;
an elastic band having a secured portion and a bundling portion;
an attachment member positioned at the distal region to attach to an animal or animal garment; and
a receptacle at the distal region, said receptacle formed by a transverse through-hole formed between two stacked layers of leash that creates a first side opening and an opposing side opening that are freely open to the surroundings, wherein the secured portion is fixed to an interior surface of the receptacle and self-contained therein, and wherein the bundling portion is in the form of a loop that loops around an exterior surface of the receptacle from the first side opening to the opposing side opening such that when the leash is coiled together the bundling portion can be stretched and wrapped around the coiled leash to self-store the leash in a bundled and compact form.

15. The animal leash of claim 14 wherein the attachment member has an eyelet connected with a securing mechanism, wherein the distal end of the leash is threaded through the eye to loop the eye between the two layers of leash, and wherein the securing mechanism comprises at least one of a spring hook, a non-swivel hook, a swivel hook, a bolt snap, a trigger snap, a marine hook, or a lobster claw to assemble to an animal or animal garment.

16. The animal leash of claim 15 wherein the proximal region comprises a handle, said handle formed as a loop by looping a proximal end of the leash onto a more distal portion therefrom and securing the proximal end thereto.

* * * * *